June 30, 1959   D. J. CHRISTENSON ET AL   2,892,571
METERING ADJUSTMENT MEANS FOR FERTILIZER SPREADER
Filed Nov. 20, 1956   3 Sheets-Sheet 1

INVENTORS
DONALD J. CHRISTENSON
CHARLES W. HANSEN
MARTIN A. RICHARDSON
BY
AGT.

June 30, 1959  D. J. CHRISTENSON ET AL  2,892,571
METERING ADJUSTMENT MEANS FOR FERTILIZER SPREADER
Filed Nov. 20, 1956  3 Sheets-Sheet 3

INVENTORS
DONALD J. CHRISTENSON
CHARLES W. HANSEN
MARTIN A. RICHARDSON
BY
AGT.

United States Patent Office 2,892,571
Patented June 30, 1959

2,892,571

METERING ADJUSTMENT MEANS FOR FERTILIZER SPREADER

Donald J. Christenson, Kansasville, and Charles W. Hansen and Martin A. Richardson, Racine, Wis., assignors to J. I. Case Company, Racine, Wis., a corporation of Wisconsin Application November 20, 1956, Serial No. 623,352

7 Claims. (Cl. 222—43)

This invention relates to a fertilizer spreader and especially to the type of spreader having transverse, sliding metering plates that pass over openings through which the fertilizer flows.

More specifically this invention relates to a means to permit the operator to clear the openings of the hopper when they have become clogged, and to accurately return the metering plates to a preset position without requiring him to leave the tractor seat.

It is well known that clogging of fertilizer spreaders is usually caused by excessive humidity and results in "lumping" or "hardening" of commercial fertilizers in the hopper. Frequently, large lumps of fertilizer become lodged in the discharge openings and prevent or interfere with the accurate flow of the material through the openings in the metering plates. It is then necessary to clear the openings by shifting the metering plates to the fully-opened position in order to eject or break up the obstructions, and then shift the metering plates back to the original setting before proceeding with the distributing. As this process normally requires the operator to leave the tractor seat, much time and effort is consumed. It is a primary object of this invention to avoid this inconvenience.

Another object of this invention is to provide a means to temporarily uncover the orifices in the metering plates in order to clear a clogged condition.

Another object is to provide means to return the metering plates to the original setting after the clogging condition has been cleared.

Another object is to provide a means for clearing obstructions without requiring the tractor operator to leave his seat.

Further objects and advantages of the invention will become apparent from a consideration of the following detailed description, taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings,

Fig. 5 is a view similar to Fig. 2, but in which the mechanism has been actuated so as to obtain the setting of the metering plates as shown in Fig. 4.

Fig. 6 is a fragmentary longitudinal section through the drawbar.

Fig. 7 is a fragmentary sectional view of the drawbar taken at 7—7 of Fig. 6.

Fig. 8 is a fragmentary sectional view of the drawbar taken at 8—8 of Fig. 6.

Figure 1:
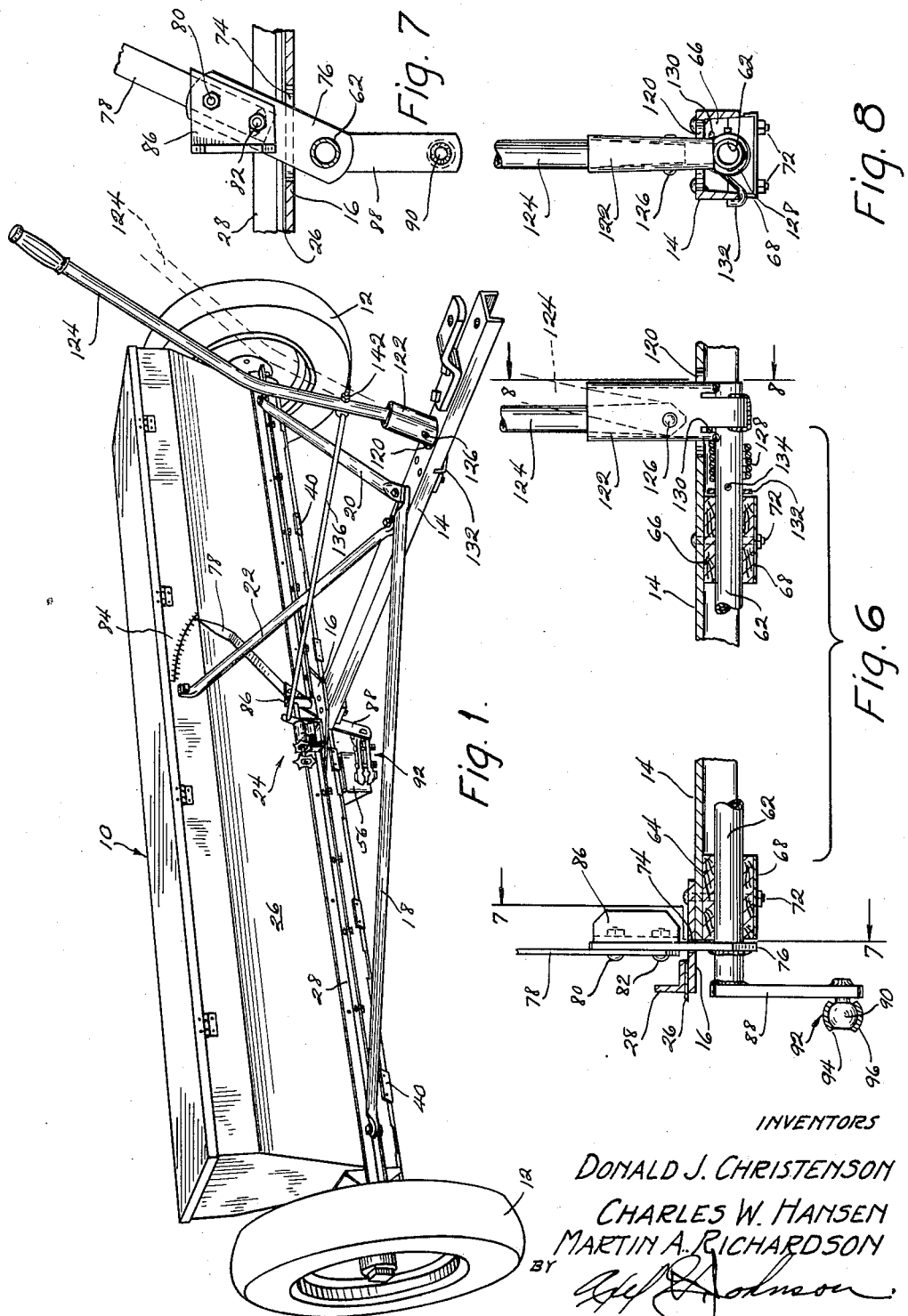
Fig. 1 is a perspective view of a fertilizer distributor embracing the invention.

Referring to Fig. 1, 10 is a hopper supported on transport wheels 12. A drawbar 14, extends forwardly from hopper 10 and terminates in means to hitch the distributor to a tractor in the conventional manner. Drawbar 14, comprises a channel member which is secured to hopper 10 by means of a gusset plate 16, and is welded thereto. Brace members 18, 20, and 22 serve to stiffen the drawbar against forces tending to flex it in lateral and vertical directions. The metering control stop assembly 24 is the gist of the invention, is clearly shown in the drawings, and will be described later.

Figure 2:
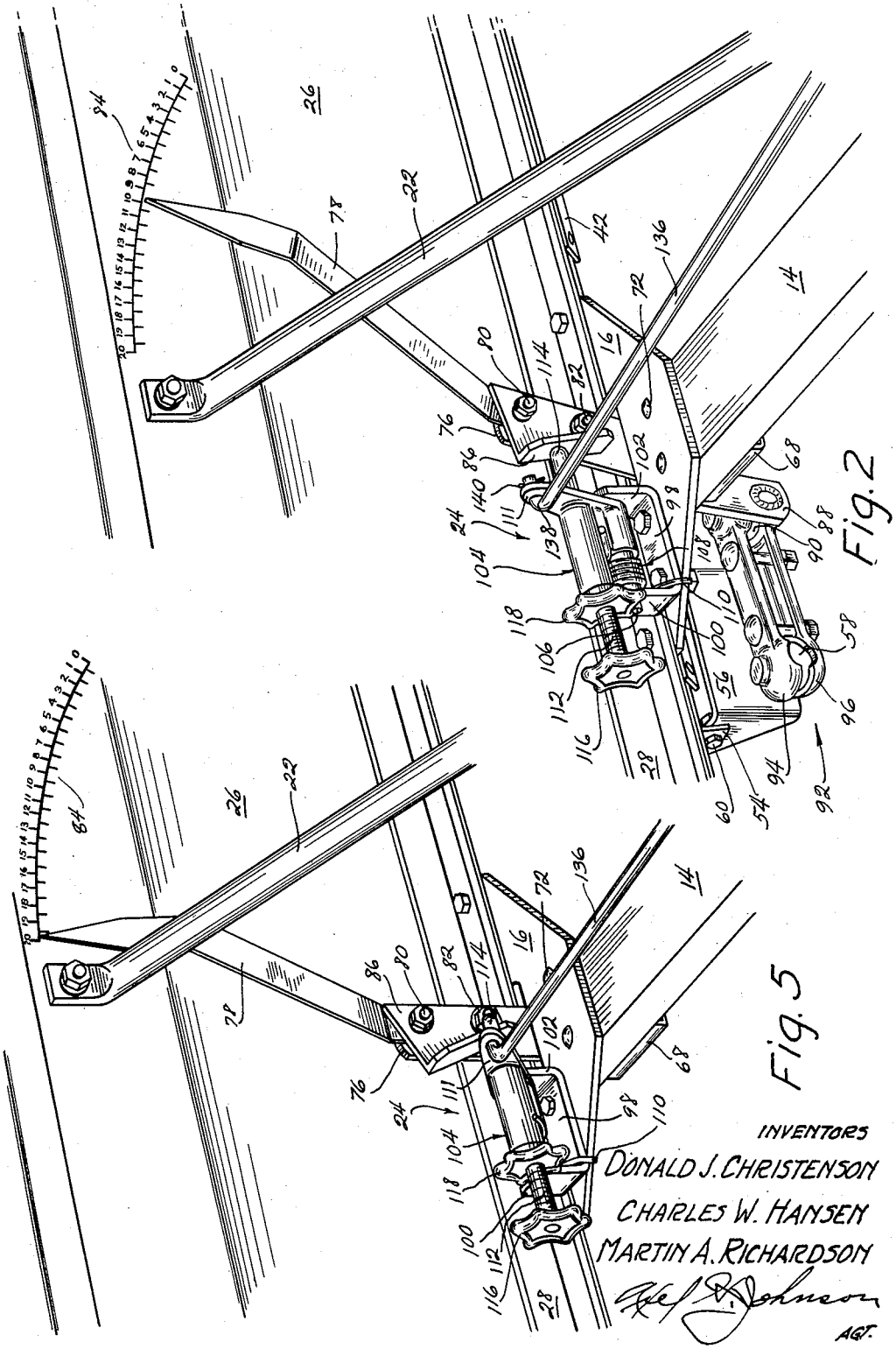
Fig. 2 is an enlarged fragmentary portion of Fig. 1, showing the invention in greater detail.
Figure 3:
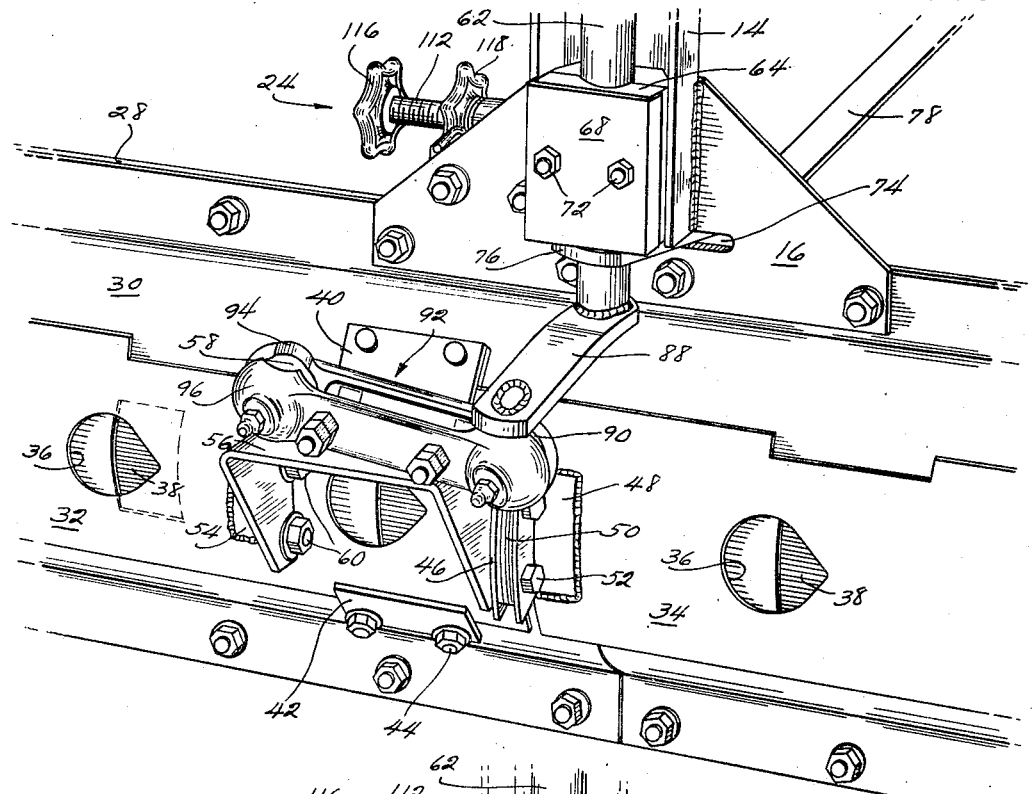
Fig. 3 is a fragmentary view looking at the bottom of the fertilizer distributor and showing the metering plates in position for distributing fertilizer.

Referring to Fig. 2, 26 is the hopper wall which terminates at angle member 28. Referring to Fig. 3, a bottom 30 having an arcuate cross section, is bolted to the underside of angle member 28. A pair of metering plates 32 and 34 are provided, having arcuate contours to conform to bottom 30, and having apertures 36. Bottom 30 is provided with a plurality of rectangular apertures 38 which generally communicate with apertures 36. A plurality of clips 40, and 42 serve to hold metering plates 32 and 34 in close contact with bottom 30, so that the fertilizer material will not accumulate between the plates 32 and 34 and the bottom 30. Clips 40 are permanently riveted in place, while clips 42 are secured with bolts 44 so as to permit plates 32 and 34 to be removed for cleaning or for other purposes.

Figure 4:
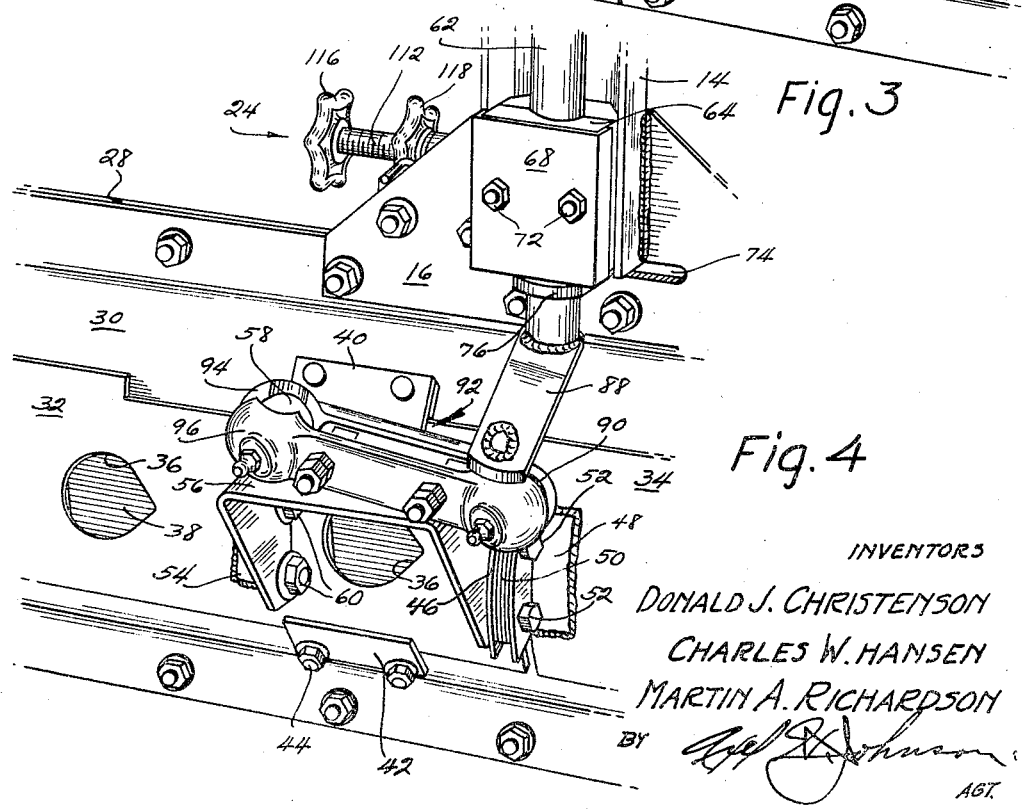
Fig. 4 is a fragmentary view similar to Fig. 3, but with the metering plates temporarily shifted so as to unclog the apertures.

Referring to Figs. 3 and 4, metering plates 32 and 34 are connected together by angle members 46 and 48 which are welded to their respective plates 32 and 34. One or more shims 50 are inserted between members 46 and 48 in order to align metering plates 32 and 34 so that apertures 36 in both plates 32 and 34 uncover equal portions of apertures 38. A pair of bolts 52 pass through members 46 and 48, and shims 50 so as to secure plates 32 and 34 together as a unit.

An angle member 54, similar to member 48 is welded or otherwise secured to plate 32 as shown in Figs. 3 and 4. A bridge member 56 extends between angle members 54 and 46 and serves to support a spherical bearing member 58. Bolts 60 and 52 are employed to secure bridge 56 to angle members 48 and 54.

Referring to Figs. 6 and 8, a shaft 62 in this instance is journalled under drawbar 14, in wood bearing blocks 64 and 66, and extends beyond both ends of the bearing blocks as shown. Blocks 64 and 66 are fitted into the channel of drawbar 14 as indicated in the drawings. Cap 68 of sheet metal embrace the surface and two sides of blocks 64 and 66 and serve to prevent cracking and to strength the block. Bolts 72 secure the blocks 64 and 66 to drawbar 14.

Plate 16 is provided with an aperture 74 substantially in alignment with the end of block 64 as shown in Fig. 6. A pointer arm 76 extends through aperture 74 and is secured to shaft 62 by welding or other suitable means. A pointer 78 is bolted to arm 76 by bolts 80 and 82. Bolt 82 passes through an elongated aperture in arm 76 so as to permit initial setting of pointer 78 relative to the graduations 84 shown in Fig. 1. An abutment plate 86 is also secured to arm 76 by bolts 80 and 82. The function of abutment plate 86 will be explained later.

A crank arm 88 extends downwardly from shaft 62 and is welded thereto. A spherical bearing member 90 is secured to arm 88 as shown in Figs. 2, 6 and 7. A link 92 comprising halves 94 and 96 embraces spherical members 58 and 90 universally together. It will be clear that a rotation of shaft 62 will now shift metering plates 32 and 34 relative to bottom 30, so that the amount of fertilizer spread per acre can be controlled by rotation of shaft 62, the various settings being indicated by pointer 78 on graduation 84.

Referring to Figs. 1, 2, and 5, the gist of the invention is the metering control stop assembly 24, and which comprises a support 98 formed as shown in the drawings having upwardly directed portions 100 and 102. Support 98 is secured to gusset plate 16 by bolts or other suitable means. A bracket 104 is pivoted intermediate portions 100 and 102 on a pin 106 extending transversely of drawbar 14, as shown in Fig. 2, and is free to swing in a direction normal to the drawbar 14. A torsion spring 108 is provided having an end 110 resting against support 98, and the other end bearing against bracket 104. The coils of spring 108 surround a portion of bracket 104 which is coaxial with pin 106. Spring 108 serves to bias bracket 104 toward hopper wall 26 and is clearly shown in Figs. 2 and 5. Bracket 104 is provided with an arm 111 the purpose of which will be explained later.

An adjusting screw 112 is threaded into the upper portion of bracket 104 on an axis parallel to that of pin 106, extends through bracket 104, and terminates in a point 114 which point is normally at rest against the face of plate 86, as shown in Figs. 1 and 2.

Screw 112 is provided with a hand wheel 116 by which the screw can be conveniently rotated when making the initial adjustment, and a lock wheel 118 is also provided which is threadedly engaged to screw 112. Lock wheel 118 is rotated so as to abut the bracket 104 after the adjustment has been made, thus locking screw 112 against unintentional turning.

Referring to Figs. 1, 6 and 8, an aperture 120 is provided in the upper web of drawbar 14, adjacent the forward end of shaft 62. A socket 122 extends freely through aperture 120, rests on shaft 62 and is welded thereto as shown in Figs. 6 and 8. A handle 124 is fitted loosely in socket 122 and is pivoted on a pin 126 so as to permit fore-and-aft swinging of handle 124 relative to socket 122 as shown in dotted lines in Figs. 1 and 6. Aperture 120 is sufficiently large to permit transverse swinging of socket 122 on rotation of shaft 62 for a purpose that will be explained later.

A torsion spring 128 is assembled on shaft 62 adjacent socket 122 and having end 130 thereof anchored in a slot in socket 122. The other end, 132 of spring 128 is anchored to the edge of drawbar 14. Spring 128, therefore, biases shaft 62 to rotation in a counterclockwise direction as viewed in Fig. 8. A washer 132 is assembled on shaft 62 adjacent bearing 66 as shown in Fig. 6, and a pin 134 is a force fit in shaft 62, intermediate spring 128, and washer 132 so as to prevent axial shifting of shaft 62 to the left.

A control link 136 extends fore-and-aft above drawbar 14 as shown in Figs. 1, 2 and 5. The end of link 136 is bent as at 138 and is passed through a hole in arm 111. A cotter 140 is inserted in a hole in portion 138 to prevent disengagement of link 136 from arm 111.

An eyebolt 142, shown in Fig. 1, is inserted in a hole in handle 124, spaced a suitable distance above pin 126 and which is provided with an aperture to receive the other end of link 136. The last-named end of link 136 is bent similarly to that at 138 and a cotter, not shown is inserted to prevent disengagement of link 136 from eyebolt 142. The ends of link 136 are a free fit in arm 111 and eyebolt 142 so that handle 124 is free to swing laterally about the axis of shaft 62 as well as in a fore-and-aft direction.

The operation of this invention will now be described: The drawbar is connected to a tractor for transportation in the usual manner. Handle 124 is urged to the left as viewed in Figs. 1, 6 and 8 by spring 128 until plate 86 contacts the end 114 of screw 112. The latter is turned by the use of wheel 116 in a direction so as to set pointer 78 at the graduation indicated for the desired rate of fertilizer distribution. Lock wheel 118 is then used to lock screw 112 against further rotation. Handle 124 is then moved to the right, so as to close aperture 38, or if desired, screw 112 can be advanced so as to hold pointer 78 at the zero position. However, it will then be necessary to return screw 112 to the proper setting before proceeding with the distribution of the fertilizer. The hopper can then be filled with the commercial fertilizer and the distributor is then ready for use. As distribution proceeds, it is frequently found that the fertilizer is not flowing uniformly from all apertures owing to clogging, so it is necessary to open the aperture completely, momentarily, so as to permit lumps of fertilizer to fall through the apertures, or be broken up by repeated opening and closing of the apertures.

When a fertilizer spreader is provided with this invention, it is merely necessary for the operator to pull handle 124 toward him, without alighting from his seat when attempting to clear an obstruction in the hopper. Manipulating the handle 124 in the above manner disengages end 114 of screw 112 from contact with plate 86. When this has been done, shaft 62 can be rocked by moving handle 124 from left to right, thus opening and closing the apertures in the metering plates and clearing the obstruction. When normal flow has been restored, handle 124 is rocked to the right so end 114 of screw 112, clears plate 86, whereupon end 114 will be biased by spring 108 toward hopper 10 to a position shown in Fig. 2. Handle 124 is then urged to the left by spring 128 so that plate 86 comes to rest against end 114, thus reestablishing the original setting of pointer 78 and likewise the original setting of the aperture openings.

The above being a complete description of an illustrative embodiment of the invention, what is claimed as new and desired to be secured by Letters Patent of the United States is:

1. In a fertilizer spreader having a transverse hopper, a frame and a forwardly extending drawbar, said hopper being provided with transversely-shiftable metering plates, in combination, a meter-control stop assembly secured to said frame, a forwardly extending shaft below said drawbar and journalled thereon, means integrally depending from said shaft and universally connected to said metering plates for shifting the latter upon rotation of said shaft, an upwardly extending metering pointer being secured to said shaft to turn therewith, an upwardly extending socket being secured to said shaft at a point forwardly of said pointer and extending upwardly through an aperture in said drawbar, said control-stop assembly comprising a support, an adjustment bracket journalled in said support on a transverse pivot, a transverse adjusting screw rotatably engaged in said bracket and spaced above said transverse pivot, said adjusting screw terminating in an abutment end adjacent said pointer, an abutment plate secured to said pointer for engagement with said abutment end, a means to manually rotate said screw, means engaging the thread of said screw and contacting said bracket to lock said screw against rotation, an upwardly-extending handle pivoted in said socket on a transverse axis and a link flexibly connecting said bracket with said handle to effect forward rotation of said bracket by means of said handle so as to disengage said abutment end of said screw from contact with said abutment plate in a direction normal to the axis of said screw, and resilient means to bias said adjusting screw in abutting relation with said abutment plate.

2. In a fertilizer spreader having a transverse hopper, being provided with transversely-shiftable metering plates and a forwardly extending drawbar, in combination, a forwardly-extending shaft below said drawbar and journalled thereon, means integrally secured to said shaft for universal connection to said metering plates for shifting the latter upon rotation of said shaft, an upwardly extending metering pointer being secured to said shaft to turn therewith, an upwardly extending socket secured to said shaft and passing through an aperture in said drawbar, a control-stop assembly comprising a support secured to said frame, an adjustment bracket journalled in said support on a transverse pivot, a transverse adjusting screw threadedly engaged in said bracket and having an axis spaced above said transverse pivot, said adjusting screw terminating in an abutment adjacent said pointer, an abutment plate secured to said pointer for engagement with said abutment, a means to manually adjust said screw, means engaging the thread of said screw to lock the latter against rotation, an upwardly extending handle pivoted in said socket on a transverse axis and a link flexibly connecting said bracket with said handle to compel forward rotation of said bracket on forward movement of said handle so as to disengage said abutment of said screw from contact with said abutment plate, and means to bias said adjusting screw in normal abutting relation with said abutment plate.

3. In a fertilizer spreader having a transverse hopper, a frame and a forwardly extending drawbar secured thereto, said hopper provided with transversely-shiftable metering plates, in a combination, a forwardly extending shaft journalled below said drawbar, means depending from said shaft and universally connected to said metering plates for shifting the latter upon rotation of said shaft, a metering pointer secured to said shaft to turn therewith, an upwardly extending socket secured forwardly to said shaft and extending through an aperture in said drawbar, a control-stop assembly comprising a support secured to said frame, a bracket journalled in said support on a transverse pivot, a transverse adjusting screw threadedly engaged in said bracket above said transverse pivot, said adjusting screw terminating adjacent said pointer, an abutment plate secured to said pointer for engagement with said adjusting screw, means to lock said screw against rotation, an upwardly-extending handle pivoted on said socket on a transverse axis and a link flexibly connecting said bracket with said handle to permit forward rotation of said bracket by means of a fore-and-aft rocking of said handle so as to disengage said screw from contact with said abutment plate, and means to bias said adjusting screw in axial-abutment relation with said abutment plate.

4. In a fertilizer spreader having a hopper, a frame and a forwardly extending drawbar, said hopper provided with a transversely-shiftable metering plate, in combination, a metering-control stop assembly secured to said frame, a forwardly extending shaft journalled on said drawbar, means integral with said shaft and being universally connected to said metering plate for shifting the latter upon rotation of said shaft, an upwardly extending pointer being secured to said shaft to turn therewith, a handle pivoted to said shaft on a transverse axis at a point forwardly of said pointer, said control-stop assembly comprising a support, an adjustment bracket journalled in said support on a transverse pivot, a transverse adjusting screw threadedly engaged in said bracket, and terminating in an abutment end adjacent said pointer, an abutment member secured to said pointer for engagement with said abutment end, a means to manually rotate said screw, means to lock said screw against rotation, and a link flexibly connecting said bracket with said handle to effect forward rotation of said bracket by means of a forward swinging of said handle so as to disengage said abutment end of said screw from contact with said abutment member.

5. In a fertilizer spreader having a hopper, and being provided with a transversely-shiftable metering plate and a forwardly extending drawbar, in combination, a forwardly-extending shaft journalled on said drawbar, means secured to said shaft for universal connection to said metering plate for shifting the latter upon rotation of said shaft, a pointer being secured to said shaft to turn therewith, an upwardly-extending handle pivotally related to said shaft on a transverse pivot and passing freely through an aperture in said drawbar, a control-stop assembly comprising a support secured to said frame, an adjustment bracket journalled in said support on a transverse pivot, an adjusting screw threadedly engaged in said bracket and terminating adjacent said pointer, an abutment plate secured to said pointer for engagement with said screw, and a link flexibly connecting said bracket with said handle to permit forward rotation of said bracket on forward movement of said handle so as to disengage said screw from contact with said abutment plate.

6. In a fertilizer spreader having a hopper, a frame and a forwardly extending drawbar secured thereto, said hopper provided with a transversely-shiftable metering plate, in combination, a forwardly extending shaft journalled on said drawbar, means secured to said shaft and connected to said metering plate for shifting the latter upon rotation of said shaft, a pointer secured to said shaft to turn therewith, an upwardly-extending handle pivoted forwardly of said pointer to said shaft on a pivot having a transverse axis, a control-stop assembly comprising a support secured to said frame, a bracket journalled in said support on a transverse pivot, an adjusting member shiftable transversely in said bracket, said adjusting member terminating adjacent said pointer, an abutment plate normal to said pivot secured to said pointer for engagement with said adjusting member, and a link flexibly connecting said bracket with said handle to permit forward rotation of said bracket by means of a fore-and-aft rocking of said handle so as to prevent said adjusting member from contact with said abutment plate upon rotation of said shaft.

7. In a fertilizer spreader having a hopper, a frame and a forwardly extending drawbar, said hopper provided with a transversely-shiftable metering plate, in combination, a metering-control stop assembly secured to said frame, a forwardly extending rotatable shaft on said drawbar, means integral with said shaft and connected to said metering plate for shifting the latter upon rotation of said shaft, a handle pivoted to said shaft on a transverse axis at a point spaced from said assembly, said control-stop assembly comprising a support, an adjustment bracket journalled in said support on a transverse pivot, a transverse adjusting member mounted in said bracket, an abutment member secured to said shaft for engagement with said adjusting member and having a surface, and a link flexibly connecting said bracket with said handle to effect forward rotation of said bracket by means of a forward swinging of said handle so as to permit rotation of said shaft without engagement of said abutment member with said adjusting member.

References Cited in the file of this patent

UNITED STATES PATENTS

| | | |
|---|---|---|
| 1,327,455 | Willis et al. | Jan. 6, 1920 |
| 2,772,038 | Morrissey | Nov. 27, 1956 |
| 2,778,535 | Seltzer | Jan. 22, 1957 |